(12) United States Patent
Vanmoor

(10) Patent No.: US 8,555,611 B2
(45) Date of Patent: Oct. 15, 2013

(54) COMBUSTION ENGINE WITH FEEDBACK GEAR/ROTARY PUMP INPUT

(76) Inventor: Arthur Vanmoor, Amsterdam (NL)

( * ) Notice: Subject to any disclaimer, the term of this patent is extended or adjusted under 35 U.S.C. 154(b) by 863 days.

(21) Appl. No.: 12/318,308

(22) Filed: Dec. 24, 2008

(65) Prior Publication Data

US 2009/0165441 A1    Jul. 2, 2009

Related U.S. Application Data

(60) Provisional application No. 61/017,030, filed on Dec. 27, 2007.

(51) Int. Cl.
*F01C 1/00* (2006.01)
*F02C 3/00* (2006.01)

(52) U.S. Cl.
USPC .............. 60/39.45; 60/39.63; 123/204; 418/9

(58) Field of Classification Search
USPC .................... 60/39.45, 39.63; 123/204; 418/9; 417/410.1
See application file for complete search history.

(56) References Cited

U.S. PATENT DOCUMENTS

| | | | | |
|---|---|---|---|---|
| 3,214,907 A * | 11/1965 | Martin | ............. | 60/792 |
| 3,782,340 A * | 1/1974 | Nam | ............. | 123/204 |
| 3,826,085 A * | 7/1974 | Dworski | ............. | 60/805 |
| 3,856,490 A | 12/1974 | Heintzelman | | |
| 3,921,597 A * | 11/1975 | Franco | ............. | 123/228 |
| 3,940,925 A * | 3/1976 | Kelley | ............. | 60/39.45 |
| 3,996,899 A * | 12/1976 | Partner et al. | ............. | 123/204 |
| 5,605,124 A * | 2/1997 | Morgan | ............. | 123/222 |
| 5,803,027 A | 9/1998 | Bell et al. | | |
| 6,725,644 B2 * | 4/2004 | Vanmoor | ............. | 60/39.45 |
| 2004/0261758 A1 | 12/2004 | Fong et al. | | |
| 2005/0198957 A1 | 9/2005 | Kim | | |
| 2006/0283419 A1 | 12/2006 | Mihailescu | | |

FOREIGN PATENT DOCUMENTS

DE        10343380 A1 *    5/2005

OTHER PUBLICATIONS

International Search Report dated Feb. 24, 2009.

* cited by examiner

*Primary Examiner* — Tran Nguyen
*Assistant Examiner* — Leda Pham
(74) *Attorney, Agent, or Firm* — Laurence A. Greenberg; Werner H. Stemer; Ralph E. Locher

(57) ABSTRACT

A combustion engine, which is highly efficient, noiseless and lightweight, includes a combustion chamber without pistons. The combusted and expanded air exiting the combustion chamber flows into a displacement pump, such as a gear pump or radial vane pump. The displacement pump drives the load, and, in addition, another smaller displacement pump, which pressurizes fresh air and introduces same, via a feedback loop, into the combustion chamber. Gas or other burnable fuels are introduced in the combustion chamber, so that a continuous fuel burning will occur, after being ignited. The ratio of bigger to the smaller pump is influenced by the percentage of expansion of the air in the combustion chamber. Additional features could be implemented for optimization of performance of the combustion chamber, such as: spring loaded adjustable baffles within the chamber to create desired compression, meandering walls and protrusions in the feedback loop, and heating the air in the smaller pump prior to entry into the feedback loop.

25 Claims, 2 Drawing Sheets

COMBUSTION ENGINE WITH FEEDBACK GEAR/ROTARY PUMP INPUT

CROSS-REFERENCES TO RELATED APPLICATION

This application is based on provisional patent application Ser. No. 61/017,030, filed Dec. 27, 2007.

FIELD OF THE INVENTION

The instant invention pertains generally to internal combustion engines and more particularly to a gear or a rotary pump, that introduces fresh air, under pressure, into the combustion chamber of the engine via a feedback loop.

BACKGROUND OF THE INVENTION

Internal combustion engines, employing a combustion chamber with pistons responding to the explosions occurring within the chamber, to drive pistons operatively associated with a drive shaft, to perform work, such as powering a vehicle, are well known. Such engines require timing belts to coordinate the movement of various engine components, and valves to introduce the fuel and air into the chamber, ignition devices, such as spark plugs, etc.

SUMMARY OF THE INVENTION

The instant invention pertains to an internal combustion engine, of a simplified, yet efficient design, that obviates the need for pistons, timing belts, valves, muffler, etc. associated with known internal combustion engines. Thus, potential manufacturing, installation, and maintenance costs are reduced.

Furthermore, applicant's invention realizes an internal combustion engine that burns fuel more efficiently and produces a cleaner exhaust with reduced $CO_2$ content.

Additionally, applicant's invention is lighter than known internal engines of the same horsepower/torque, which will enable the instant invention to find potential applications in air craft, boats, and vehicles of all sizes. In the same vein, applicant's invention will save fuel.

Also, the combustion chamber in applicant's invention is mounted perpendicular to a drive shaft, which has two rotary gears, or pumps, of different sizes, mounted thereon. The larger gear, or pump, receives the hot gases exiting from the exhaust pipe of the combustion chamber, and rotates to perform work. The rotation of the larger gear also turns the smaller gear, or pump, which forces air, in a feedback loop, into the combustion chamber.

Whereas, the preferred embodiment of applicant's invention utilizes a pair of gear, or rotary, pumps of dissimilar sizes mounted upon a common drive shaft, other arrangements may be employed with equal success. Also, radial vane pumps, or other air tight pumps, may be used.

Lastly, applicant's invention utilizes a combustion chamber that enables continuous burning of the air/fuel mixture, without the explosions associated with known internal combustion engines.

These advantages, and other advantages and improvements, will become apparent to the skilled artisan from an inspection of the drawings, and the ensuing specification. The drawings are identified below.

DETAILED DESCRIPTION OF THE INVENTION

Figure 1:
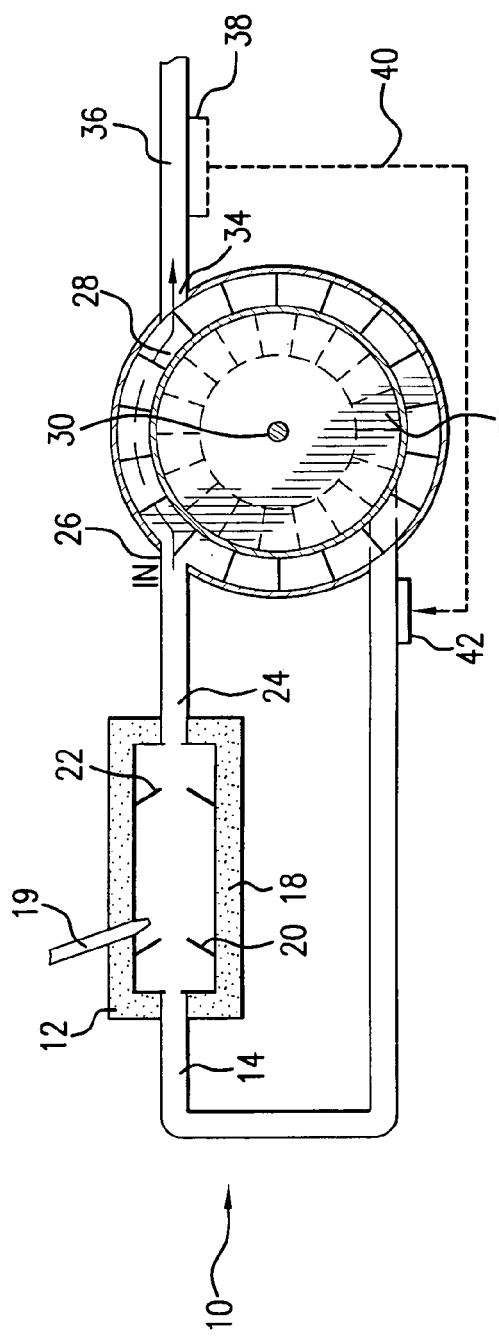
FIG. 1 is a schematic drawing of applicant's internal combustion engine.

FIG. 1 shows applicant's internal combustion engine, identified generally by reference numeral 10. IC engine 10 includes combustion chamber 12, including inlet conduit 14 for introducing air, and nozzle 16 for introducing fuel, such as gas. Insulation 18 extends about the exterior of chamber 12 to reduce heat loss.

Inlet baffles 20 are located between inlet 14 and the central expanse of combustion chamber 12, while outlet baffles 22 are located between the combustion chamber 12 and outlet, or exhaust conduit 24. An igniter (not shown), such as a spark plug, is used to initiate combustion of the air fuel mixture within combustion chamber 12. Combustion then continues, unabated, without the need for any further ignition from an external source.

The gas/air mixture in combustion chamber 12 burns, and the heated air, which has expanded in volume, exits through conduit 24. The heated air is led to the inlet port 26 of the large turbine 28, which is mounted on drive shaft 30. A second, smaller turbine 32 is also mounted on drive shaft 30. The heated air that drives large turbine 28 also drives smaller turbine 32. Drive shaft 30 produces the force needed for performing work, such as driving a vehicle, driving a generator, and the like.

The air traveling through large turbine 28 passes through exit port 34 and enters exhaust passage 36 before being vented to the atmosphere. Smaller turbine 32 gathers fresh air and delivers same through exhaust passage 36 into inlet conduit 14 for introduction into combustion chamber 12. Heat exchanger 38 is secured to exhaust passage 36 to deliver hot air to inlet conduit 14, via line 40 and inlet 42, to increase the temperature of the incoming, re-circulated air in inlet conduit 14.

Turbines 44,46,48,50,52 of progressively larger sizes, are secured to drive shaft 43. The heated air leaving the combustion chamber flows into exhaust conduit 54, past opened valve 56, and into the housing of turbine 52. Turbine 52 rotates and drives shaft 43; the progressively smaller turbines rotate with shaft 43.

Heated air traveling in conduit 54 also flows past opened valve 58 and supplies power to turbine 50. Similarly, heated air traveling in conduit 53 flows past opened valve 60 to supply power to turbine 46. Valves 62, and 64 are closed, so that the heated air traveling in conduit 58 does not reach turbines 48 and 44. Turbines 44 and 48, however, are available to deliver fresh air to the inlet conduits of one, or more, combustion chambers within an internal combustion engine. The plurality of valves are retained within controller 65 (shown in dotted outline), which may be manually or automatically operated. A variety of combination of valves, within the controller, may be opened or closed, to provide nearly infinite, variable power adjustment, without a known transmission system.

Figure 2:
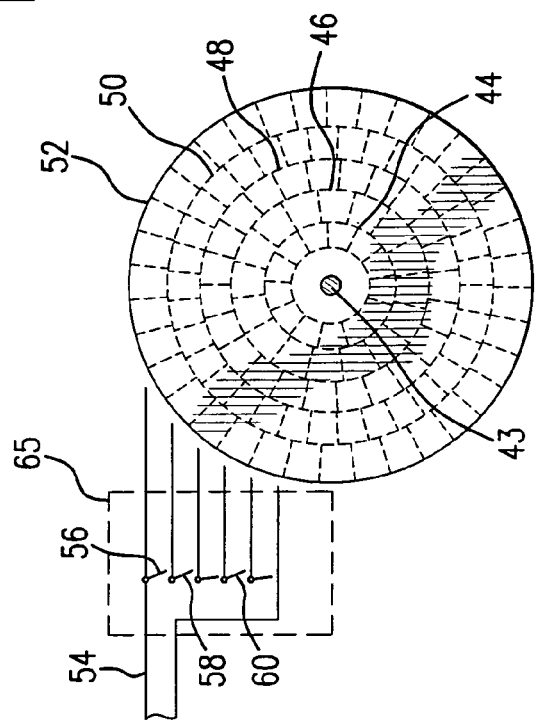
FIG. 2 is a schematic drawing of several turbines, mounted on a common shaft, and driven by the exhaust from the combustion chamber of the internal combustion engine.

Although FIGS. 1 and 2 depict two, or more, cooperating turbines mounted on a common drive shaft, such as shaft 30 in FIG. 1 and shaft 43 in FIG. 2, the cooperating turbines may be mounted on two separate shafts. The shafts could be joined by an endless belt or chain, and thus rotate in unison. An alternator (not shown) could be secured between the two turbines, disposed on separate shafts.

Figure 3:
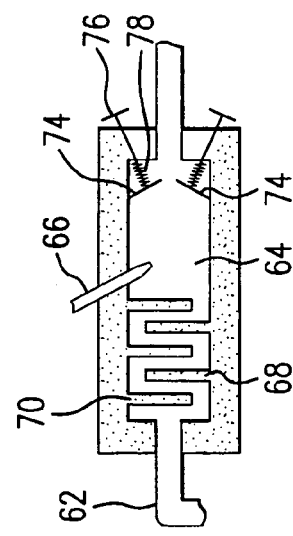
FIG. 3 is a schematic drawing of an alternative embodiment of the combustion chamber shown in FIG. 1.

FIG. 3 shows another embodiment of the combustion chamber employed in applicant's internal combustion engine. Inlet conduit 62 introduces air into combustion chamber 64, while nozzle 66 introduces gas. The air entering from conduit 62 travels in a serpentine path, demarcated by upwardly extending baffle 68 and downwardly extending baffles 70. The serpentine path insures adequate pre-heating of the air entering chamber 64 to improve combustion.

After the air/gas mixture has been burned in chamber 64, the hot air escapes through exit conduit 72. Outlet baffles 74 are positioned in chamber 64, upstream of exit conduit 72. Knobs 76 can be rotated to adjust the tension in springs 78 to adjust the position of outlet baffles 74. The springs bias the outlet baffles against the combustion pressure within chamber 64, and function as a check-valve to maintain the pressure of the exiting gas at a satisfactory level, and free from pressure surges.

Figure 4:
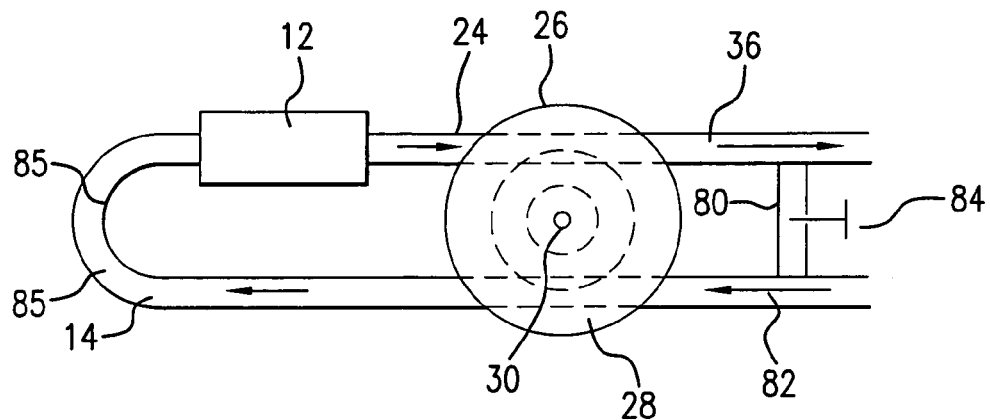
FIG. 4 is a schematic drawing of an alternative arrangement for connecting the outlet of the larger turbine to the input for the smaller turbine of the embodiment of FIG. 1.

FIG. 4 depicts an alternative manner of transferring heated air from the larger turbine to the inlet for the smaller turbine of the embodiment of FIG. 1. Before reaching exhaust 36, a portion of the heated air in turbine 28 passes into pipe 80 and flows into inlet 82, which is aligned with inlet conduit 14. Valve 84 is adjusted to regulate the volume of the by-pass flow. The adjustment, which may be achieved manually or automatically, introduces some hot air to mix with the cold air in inlet conduit 14; at high speeds, valve 84 is opened wide, while at low speed, valve 84 is moved toward a closed position to limit by-pass flow. Protrusion 85 may extend into the by-pass flow to extend the effective length of the feedback loop and thoroughly mix the exhaust gas and incoming air.

Figure 5:
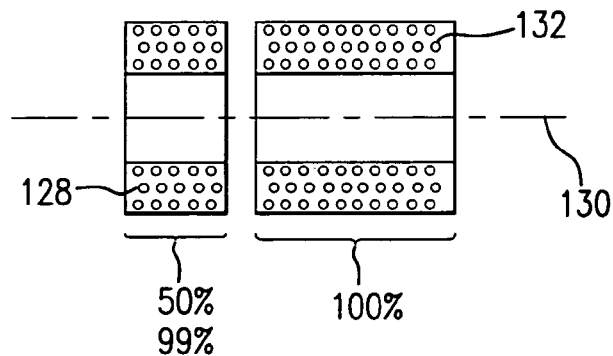
FIG. 5 is a schematic drawing showing an alternative embodiment of the larger and smaller turbines employed in applicant's internal combustion engine.

FIG. 5 depicts an alternative embodiment of the larger and smaller turbines 28, 32 shown in the embodiment of FIG. 1. Turbines 28,32 process different volumes of air because of the differences in radial dimensions. Turbines 28, 32 may be replaced by turbines 128, 132 mounted upon drive shaft 130; turbines 128 and 132 are equal in radial dimension(s). However, turbine 132 possesses a greater axial length, and associated volumetric capacity, that ranges from 50°-99° of the volumetric capacity of turbine 132. The same ranges pertain with turbines 28,32 of different radial dimensions.

Figure 6:
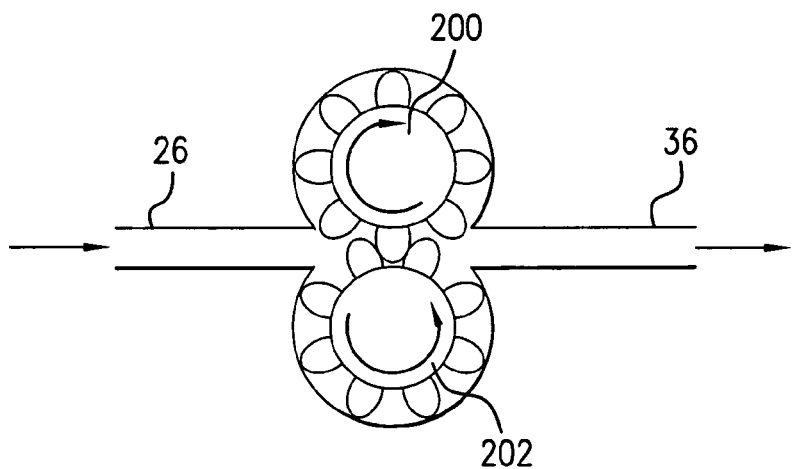
FIG. 6 shows a pair of interengaging gears, that may be used in lieu of the larger turbine in application's internal combustion engine.

FIG. 6 shows a pair of gears 200,202 that may be utilized in lieu of larger turbine 12 in the embodiment of FIG. 1. The gears are powered by the heated air passing through inlet 26 and exiting, downstream, via exhaust 36. The teeth on gears 200, 202 intertwine, or interengage, to provide a leak-proof seal. Gears 200,202 are secured to positively driven fluid displacement pumps of the type shown in U.S. Pat. No. 6,530,365, and U.S. Pat. No. 6,632,145, granted to the applicant on Mar. 11, 2003, and Oct. 14, 2003, respectively.

Various refinements and modifications will occur to the skilled artisan. For example, more than one set of baffles may be used as check-valves, on opposite sides, of combustion chamber 12, or 64. Gas may be introduced via a single nozzle, or via several branches emanating from a single inlet. A funnel shaped opening may be positioned between the end of inlet conduit and the combustion chamber; the funnel assists in keeping the incoming air in contact with the gas for more complete combustion.

As an illustrative example, applicant suggests, subject to testing and verification, that the ratio of the larger rotary pump to the smaller rotary pump should be 125% greater, to allow for a 25% expansion of the heated gas. Similarly, if the heated gas expands by 35%, then the larger pump should be 135% greater, in volumetric capacity, than the smaller pump. Here, too, more exact ratios and operating parameters will be known, when a prototype internal combustion engine is fabricated and tested.

The term turbine has been used for illustrative purposes, and is intended to embrace turbines which are not air-tight, such as used in jet engines, radial vane turbines, which minimize leakage, and fluid displacement pumps that positively displace the fluid for its intended purpose, and similar pumps.

Accordingly, other modifications and revisions will occur to the skilled artisan from a consideration of the specification and the associated drawings. Hence, the appended claims should be broadly construed in a manner consistent with the expansive nature of the instant invention and should not be limited to their literal terms.

What is claimed is:

1. A combustion engine, comprising:
first and second positive displacement pumps;
a combustion chamber disposed between said positive displacement pumps and a nozzle disposed to introduce combustible material into said combustion chamber, said combustion chamber having a constant combustion chamber volume;
said first positive displacement pump being connected to receive exhaust gas from said combustion chamber and being connected to a drive shaft for driving a load; and
said second positive displacement pump introducing air into said combustion chamber.

2. The combustion engine according to claim 1, wherein a driven member of said first positive displacement pump is mounted on said drive shaft.

3. The combustion engine according to claim 1, wherein said drive shaft is directly or indirectly connected to said second positive displacement pump.

4. The combustion engine according to claim 1, wherein said first positive displacement pump has a greater volumetric displacement than said second positive displacement pump.

5. The combustion engine according to claim 1, wherein said first positive displacement pump comprises a pair of gears with interengaging teeth for positively displacing the exhaust gas flowing away from said combustion chamber.

6. The combustion engine according to claim 1, which comprises baffles disposed between said nozzle and said first positive displacement pump.

7. The combustion engine according to claim 6, which comprises adjustment means for altering a tension applied to said baffles.

8. The combustion engine according to claim 1, wherein said first positive displacement pump includes a plurality of rotary pumps communicating with the outlet of said combustion chamber and said plurality of said rotary pumps have a plurality of different displacement capacity sizes.

9. The combustion engine according to claim 8, which comprises means for individually selecting one or more of said plurality of rotary pumps.

10. A combustion engine, comprising:
a combustion chamber having a constant combustion chamber volume;

a nozzle disposed to introduce a combustible fluid into said combustion chamber;

an inlet disposed to introduce air into said combustion chamber, wherein a fluid/air mixture formed of said combustible fluid and said air is burned and exhaust gas is formed;

a rotatably mounted drive shaft and rotary power means connected to rotate said drive shaft;

a connection leading the exhaust gas exiting from said combustion chamber to said rotary power means to rotate said drive shaft; and baffles disposed between said nozzle and said rotary power means.

11. The combustion engine according to claim 10, wherein said rotary power means is a substantially positive fluid displacement pump.

12. The combustion engine according to claim 10, which comprises feedback power means rotated by said rotary power means and pressurizing air into said feedback loop.

13. The combustion engine according to claim 10, wherein said rotary power means includes first power means directly driving said drive shaft and a second rotary power means for pressurizing said feedback loop.

14. The combustion engine according to claim 13, wherein said second rotary power means is a positive fluid displacement pump.

15. The combustion engine according to claim 13, wherein said first rotary power means has a greater volumetric displacement than said second rotary power means.

16. The combustion engine according to claim 13, wherein said first rotary power means comprises a pair of gears with interengaging teeth for positively displacing the exhaust gases flowing away from said combustion chamber.

17. The combustion engine according to claim 13, wherein said second rotary power means comprises a pair of interengaging teeth for positively displacing fluid in the combustion chamber.

18. The combustion engine according to claim 10, wherein said baffles are disposed in said combustion chamber, to compress the gas and the air mixture.

19. The combustion engine according to claim 18, which comprises adjustment means for altering a tension applied to said baffles.

20. The combustion engine according to claim 10, wherein inlet baffles are situated within said combustion chamber, forming a meandering path at said inlet into said combustion chamber to facilitate mixing of the gas and air entering said combustion chamber.

21. The combustion engine according to claim 10, wherein said rotary power means includes two substantially air-tight displacement pumps.

22. The combustion engine according to claim 10, wherein said rotary power means includes a plurality of rotary pumps communicating with the outlet of said combustion chamber and said plurality of said rotary pumps have a plurality of different displacement capacity sizes.

23. The combustion engine according to claim 10, wherein a rotation of said rotary power means causing air to be forced into a feedback loop connected to feed air into said air inlet to said combustion chamber.

24. The combustion engine according to claim 6, wherein said baffles are disposed in said combustion chamber.

25. The combustion engine according to claim 6, wherein inlet baffles are dispose within said combustion chamber, forming a meandering path at said inlet into said combustion chamber to facilitate mixing of the gas and air entering said combustion chamber.

* * * * *

UNITED STATES PATENT AND TRADEMARK OFFICE
CERTIFICATE OF CORRECTION

PATENT NO. : 8,555,611 B2
APPLICATION NO. : 12/318308
DATED : October 15, 2013
INVENTOR(S) : Arthur Vanmoor (a.k.a. Arthur Van Moerkerken)

It is certified that error appears in the above-identified patent and that said Letters Patent is hereby corrected as shown below:

Title Page: Item should read

(76)  Inventor: Arthur Vanmoor (a.k.a. Arthur Van Moerkerken), Amsterdam (NL)

Signed and Sealed this
Eleventh Day of February, 2014

Michelle K. Lee
*Deputy Director of the United States Patent and Trademark Office*